United States Patent
Harnay et al.

(10) Patent No.: US 12,445,331 B2
(45) Date of Patent: Oct. 14, 2025

(54) METHOD FOR DEMODULATING A RF SIGNAL IN THE PRESENCE OF INBAND HARMONIC SPURS

(71) Applicant: STMicroelectronics (Grand Ouest) SAS, Le Mans (FR)

(72) Inventors: Didier Harnay, Cesson Sevigne (FR); Francois Sittler, Thorigne-Fouillard (FR)

(73) Assignee: STMICROELECTRONICS (GRAND OUEST) SAS, Le Mans (FR)

( * ) Notice: Subject to any disclaimer, the term of this patent is extended or adjusted under 35 U.S.C. 154(b) by 86 days.

(21) Appl. No.: 18/535,788

(22) Filed: Dec. 11, 2023

(65) Prior Publication Data
US 2024/0214250 A1 Jun. 27, 2024

(30) Foreign Application Priority Data
Dec. 22, 2022 (EP) ..................... 22306989

(51) Int. Cl.
*H04L 27/227* (2006.01)
*H04L 27/00* (2006.01)

(52) U.S. Cl.
CPC ...... *H04L 27/2276* (2013.01); *H04L 27/0014* (2013.01); *H04L 2027/0016* (2013.01); *H04L 2027/0051* (2013.01)

(58) Field of Classification Search
CPC . H04B 1/30; H04B 1/109; H04B 1/28; H04B 1/406; H04B 1/16; H04B 1/006; H04B 17/318; H04B 1/40; H04B 1/0057; H04L 27/3863; H04L 27/2647; H04L 27/38; H04L 25/061; H04L 27/2621; H04L 5/0019; H04L 5/0048; H04L 7/0087; H04W 88/06; H04W 64/00; H04W 52/0245; H04W 56/00; H04W 52/52; H04W 88/04; H04W 56/0035; H04W 56/005

See application file for complete search history.

(56) References Cited

U.S. PATENT DOCUMENTS

| | | | |
|---|---|---|---|
| 5,710,998 A * | 1/1998 | Opas | H04B 1/40 455/208 |
| 11,431,092 B1 * | 8/2022 | Jacquet | H04B 17/12 |
| 2008/0055008 A1 * | 3/2008 | Staszewski | H03B 21/00 331/37 |
| 2010/0177850 A1 | 7/2010 | Iizuka | |
| 2011/0076977 A1 * | 3/2011 | Coban | H03G 3/3068 455/234.1 |
| 2015/0038099 A1 * | 2/2015 | Giles | H04B 1/123 455/306 |
| 2017/0187407 A1 * | 6/2017 | He | H04B 1/28 |
| 2022/0393931 A1 * | 12/2022 | Kostelac | H04B 1/0458 |

FOREIGN PATENT DOCUMENTS

| | | |
|---|---|---|
| EP | 2383913 A1 | 11/2011 |
| WO | 2011071832 A1 | 6/2011 |

* cited by examiner

*Primary Examiner* — Eva Y Puente
(74) *Attorney, Agent, or Firm* — SLATER MATSIL, LLP

(57) ABSTRACT

The present disclosure relates to a method for demodulating a radio frequency (RF) signal comprising the steps of determining the nearest harmonic of a clock signal from a central frequency (Frx) of a received frequency band; and, if said nearest harmonic is in said frequency band, setting an intermediate frequency (IF) of a Near Zero Intermediate Frequency (NZIF) receiver to the difference (SpurOffset) between said central frequency (Frx) and said nearest harmonic.

24 Claims, 6 Drawing Sheets

METHOD FOR DEMODULATING A RF SIGNAL IN THE PRESENCE OF INBAND HARMONIC SPURS

CROSS-REFERENCE TO RELATED APPLICATIONS

This application claims the priority benefit of European patent application number EP 22306989, filed on Dec. 22, 2022, entitled "Method for demodulating a RF signal in the presence of inband harmonic spurs," which is hereby incorporated by reference to the maximum extent allowable by law.

TECHNICAL FIELD

The present disclosure relates generally to methods for demodulating radio frequency (RF) signals and to RF circuits to implement such methods.

BACKGROUND

RF receivers can be split in two main categories: those based on a Zero Intermediate Frequency architecture (ZIF) and those based on the Near Zero Intermediate frequency (NZIF) architecture.

An NZIF receiver converts a received radio signal to an intermediate frequency whose carrier frequency is in the order of magnitude of the baseband signal bandwidth but is significantly lower than the radio carrier frequency to be demodulated. Digital clock circuits used in the system carrying the NZIF receiver may generate harmonic spurs at frequencies which are susceptible to fall in the frequency band of the RF received signal to be demodulated.

SUMMARY

There is a need to provide a method for demodulating the RF received signals which lowers the effects of clock harmonic spurs.

One or more embodiments address all or some of the drawbacks of known methods for demodulating RF signals.

One or more embodiments provides a method for demodulating a RF signal comprising the steps of: determining the nearest harmonic of a clock signal from a central frequency of a received frequency band; and, if said nearest harmonic is in said frequency band, setting an intermediate frequency of a Near Zero Intermediate Frequency receiver to the difference between said central frequency and said nearest harmonic.

One or more embodiments provide a RF signal demodulation circuit configured to: determine the nearest harmonic of a clock signal from a central frequency of a received frequency band; and, if said nearest harmonic is in said frequency band, set an intermediate frequency of a Near Zero Intermediate Frequency receiver to the difference between said central frequency and said nearest harmonic.

According to an embodiment, if said nearest harmonic is out of said frequency band, said intermediate frequency is set to a nominal NZIF value.

According to an embodiment, the determination of said nearest harmonic comprises determining a rounding of the ratio between the central frequency of the received frequency band and the frequency value of the clock signal.

According to an embodiment, said nearest harmonic is equal to the product of said rounding by the frequency value of the clock signal.

According to an embodiment, if the absolute value of the difference between said central frequency and said nearest harmonic is inferior to the half bandwidth value of the RF signal, said nearest harmonic is in said frequency band, and otherwise said nearest harmonic is out of said frequency band.

According to an embodiment, the method or the circuit comprises amplifying the RF signal and splitting the amplified signal into a first and a second paths.

According to an embodiment, the method or the circuit comprises: mixing the amplified RF signal, in the first path, with an in-phase signal of a local oscillator frequency corresponding to the sum of said central frequency and of the intermediate frequency, and mixing the amplified RF signal, in the second path, with a quadrature signal of said local oscillator frequency.

According to an embodiment, the method or the circuit comprises filtering high frequencies of the mixed signals of the first and second paths and amplifying the filtered signals.

According to an embodiment, the method or the circuit comprises converting the amplified filtered signals into digital signals.

According to an embodiment, the method or the circuit comprises mixing the digitalized signals with a third signal having the intermediate frequency IF.

According to an embodiment, the method or the circuit comprises filtering high frequencies of the digital mixed signals.

According to an embodiment, the method or the circuit comprises performing a decimation operation of the filtered and digital mixed signals.

BRIEF DESCRIPTION OF THE DRAWINGS

The foregoing features and advantages, as well as others, will be described in detail in the following description of specific embodiments given by way of illustration and not limitation with reference to the accompanying drawings, in which.

DETAILED DESCRIPTION OF ILLUSTRATIVE EMBODIMENTS

Like features have been designated by like references in the various figures. In particular, the structural and/or functional features that are common among the various embodiments may have the same references and may dispose identical structural, dimensional and material properties.

For the sake of clarity, only the operations and elements that are useful for an understanding of the embodiments described herein have been illustrated and described in detail.

Unless indicated otherwise, when reference is made to two elements connected together, this signifies a direct connection without any intermediate elements other than conductors, and when reference is made to two elements coupled together, this signifies that these two elements can be connected or they can be coupled via one or more other elements.

In the following disclosure, unless indicated otherwise, when reference is made to absolute positional qualifiers, such as the terms "front", "back", "top", "bottom", "left", "right", etc., or to relative positional qualifiers, such as the terms "above", "below", "higher", "lower", etc., or to qualifiers of orientation, such as "horizontal", "vertical", etc., reference is made to the orientation shown in the figures.

Unless specified otherwise, the expressions "around", "approximately", "substantially" and "in the order of" signify within 10%, and preferably within 5%.

Figure 1:
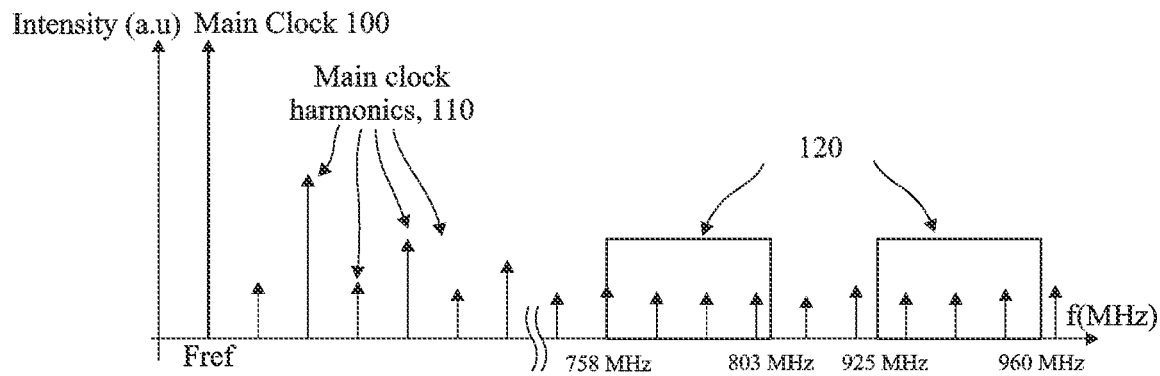
FIG. 1 is a graph of signal level as a function of the frequency illustrating an example of usual operation of a RF receiver.

FIG. 1 is a graph of signal level (Intensity (a.u)) as a function of the frequency (f(MHz)) illustrating an example of usual operation of a RF receiver.

In RF communications, the frequencies are divided in bands respectively allocated to different standards and/or operators. FIG. 1 shows two exemplary bands 120 of cellular communications, which respectively extend from 758 MHz to 803 MHz (3GPP band 28) and from 925 MHz to 960 MHz (3GPP band 8). The frequency bands are divided into channels (which are not illustrated in FIG. 1) having a bandwidth which is usually comprised between 10 kHz and 10 MHz.

RF circuits use different frequencies, which are all based on a main clock 100 (Main Clock) present in circuit. In practice, the clock signal is not perfect and generates harmonics 110 (Main clock harmonics). These harmonics are present at odd/even integer multiples of the frequency value Fref of the main clock 100. The intensity of the harmonics 110 may differ accordingly to their rank and decrease with the increase of the rank. The frequency value Fref of the main clock is much lower (with an order of magnitude of at least 10) than the frequencies of the RF cellular bands. Some of the harmonics will therefore fall in the cellular bands In the represented example, four harmonics fall in the band formed from 758 MHz to 803 MHz and three harmonics fall in the band formed from 930 MHz to 950 MHz. These specific harmonics spurs will fall in channels including their respective frequencies, which lead to deaf channels in signal reception, i.e. channels with lower performance sensitivity-wise.

Figure 2:
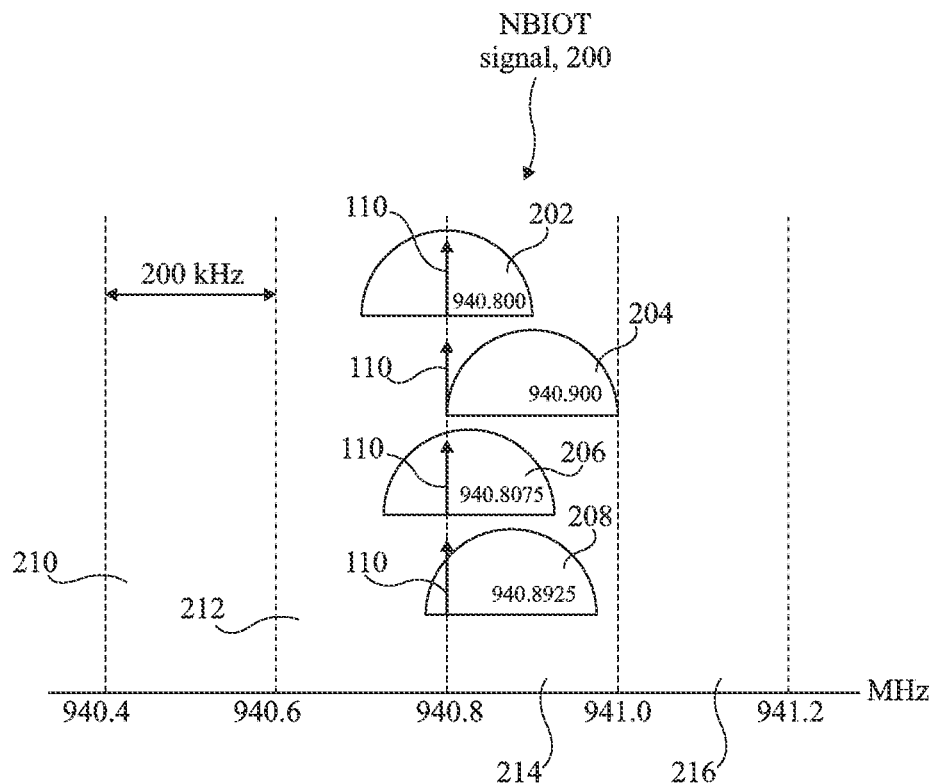
FIG. 2 illustrates examples of communication channels disturbed by a harmonic spur at various frequency offsets.

FIG. 2 illustrates examples of communication channels disturbed by a harmonic spur at various frequency offsets. More precisely, the example of FIG. 2 illustrates different channels of the 3GPP NBIOT standard (Narrow Band Internet Of Things). The NBIOT standard defines adjacent channels each having a bandwidth of 200 kHz and a central frequency. In FIG. 2, four channels 210, 212, 214, 216 are shown.

Channel assignment in RF communication, in particular the NBIOT standard may use raster offsets in the presence of a cellular band around the NBIOT channel. The example of FIG. 2 represents two standalone channels 202 and 204 (no raster offset, i.e. no cellular band around) which are respectively aligned with the 200 kHz raster of the band centered on the frequency of 940.800 MHz and aligned with a 100 kHz raster (central frequency of 940.900 MHz. FIG. 2 also shows a channel 206 having a central frequency of 940.8075 MHz, which corresponds to a "Guard Band" or "In Band" mode where the received signal is aligned on a 200 kHz raster with a raster offset of +7.5 kHz, and a channel 208 having a central frequency of 940.8925 MHz, which corresponds to a "Guard Band" or "In Band" mode where the received signal is aligned on a 100 kHz raster with a raster offset of −7.5 kHz.

In the represented example, a clock signal generated in a RF receiver and having a frequency of 19.2 MHz could generate a clock harmonic spur 110 of rank 49 at 940.800 MHz. This harmonic spur 110 will fall in the received signal channels of the configuration 202, 206 and 208.

Figure 3:
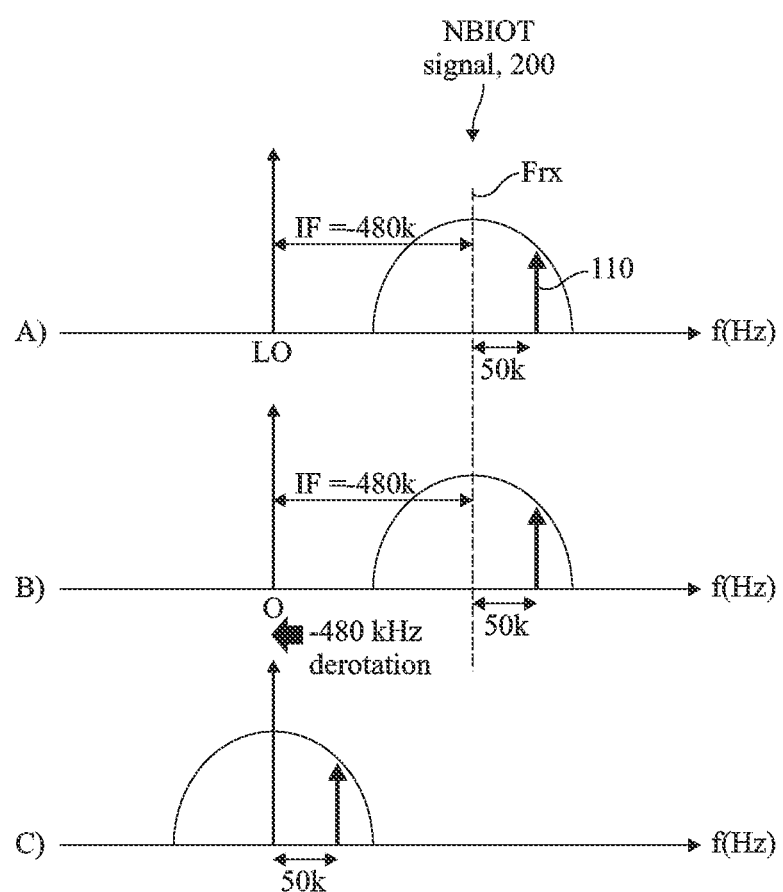
FIG. 3 illustrates a usual operation of an NZIF demodulation and the resulting harmonic spur in baseband.

FIG. 3 illustrates a usual operation of an NZIF demodulation and the resulting harmonic spur in baseband. More precisely, FIG. 3 illustrates an NZIF demodulation method applied on a received NBIOT signal 200 with a central frequency Frx and with an exemplary harmonic spur 110 present at Frx+50 kHz and falling into the signal channel.

In a step A), the intermediate frequency IF is set at −480 kHz and a first analog derotation is applied to the received signal by mixing the received signal and a signal having a local oscillator frequency LO. The frequency LO is set to be equal to the addition of the intermediate frequency IF with the received signal central frequency Frx. At the end of step A), the central frequency of the signal is shifted from the frequency LO by the intermediate frequency IF value i.e. −480 kHz.

In a step B), the signal obtained at the end of step A) is digitally processed for another derotation of −480 kHz to down convert the signal to baseband.

The resulting down converted signal is represented in C). The clock harmonic spur is still present in the demodulated signal.

The demodulation method described in FIG. 3 do not treat efficiently the effect of the harmonic spur as the clock harmonic spurs at 50 kHz is still present. In order to lower the influence of the harmonic spur 110, additional methods could be implemented using digital signal processing techniques such as band pass filter or Fast Fourier Transform (FFT) or Indirect Fast Fourier Transform (IFFT) but such efforts may lead to heavy computation and the signal may be affected.

Figure 4:
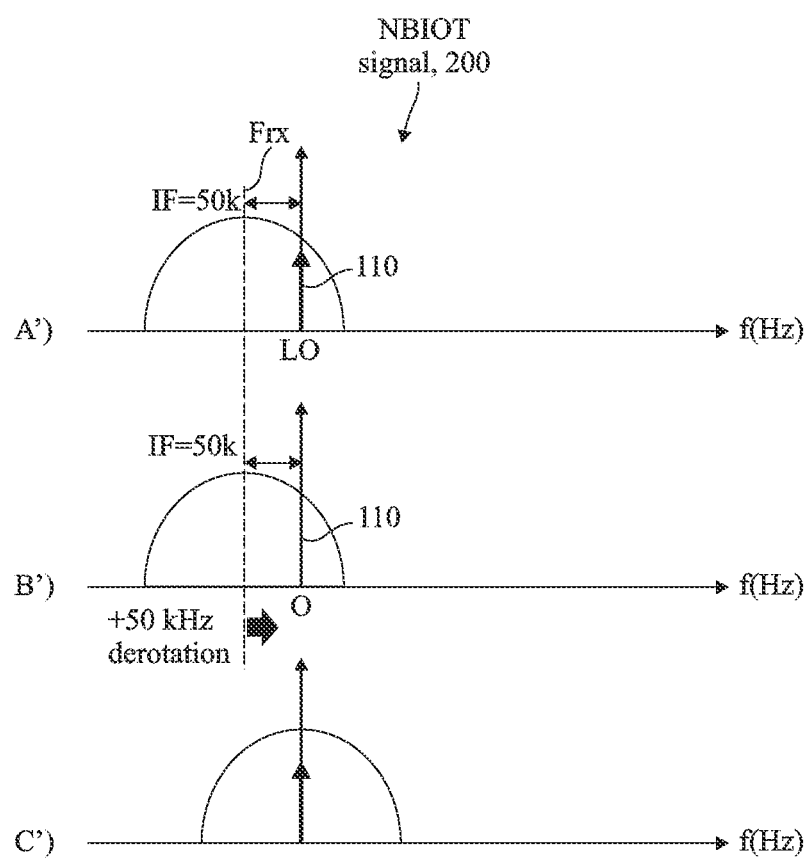
FIG. 4 illustrates an embodiment of a RF signal demodulation method.

FIG. 4 illustrates an embodiment of a RF signal demodulation method. More precisely, FIG. 4 illustrates an embodiment of a demodulation method applied on a received NBIOT signal 200 and with an exemplar harmonic spur 110 present at Frx+50 kHz and falling into the signal channel, similar to the example of FIG. 3.

In a step A'), the intermediate frequency IF is set to be equal to the clock harmonic spur 110 frequency which falls in the corresponding signal channel, i.e. here 50 kHz. In one or more embodiments, a first analog derotation is applied to the received signal, for example, by mixing the received signal and a signal having a local oscillator frequency LO. The frequency LO is set to be equal to the addition of the intermediate frequency IF with the received signal central frequency Frx. In one or more embodiments, at the end of step A'), the central frequency of the mixed signal is shifted from the frequency LO by the intermediate frequency IF value i.e. 50 kHz.

In a step B'), the signal obtained during step A') undergo a second digital derotation, for example, by digitally processing the signal for another derotation of the value of the intermediate frequency IF to down convert the signal to baseband. In one or more embodiments, during this second derotation, because the intermediate frequency IF is set at the harmonic spur 110 frequency value, the harmonic spur is now centered in the middle of the band, and will therefore be filtered by the down processing of the signal resulting in lowering its effect.

In one or more embodiments, in the resulting down converted signal represented in C), the clock harmonic spur 110 is suppressed almost completely. In one or more embodiments, the method presented in FIG. 4 improves the performance in so-called deaf channel that are affected by the harmonic clock spurs issued from the digital baseband.

Figure 5:
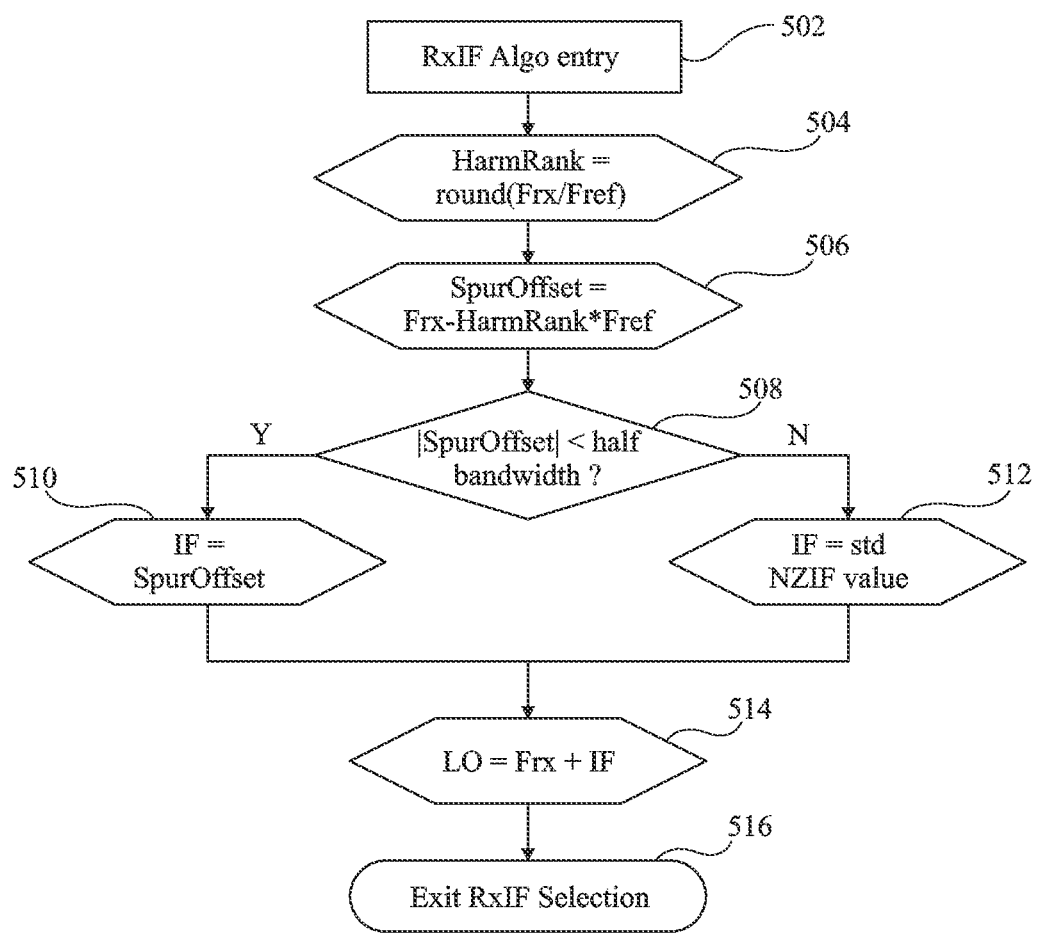
FIG. 5 illustrates an embodiment of a RF signal demodulation method.

FIG. 5 illustrates an embodiment of a RF signal demodulation method. More precisely, the FIG. 5 illustrates steps of an embodiment to determine the frequency LO to be used in the method of FIG. 4.

In a step 502 (RxIF Algo entry), the algorithm determining the frequency LO starts. In one or more embodiments, this algorithm is, for example, run prior to the demodulation method of FIG. 4.

In a step 504 (HarmRank=round(Frx/Fref)), a rounding of the ratio between the central frequency Frx of the received signal and the frequency Fref of the clock signal is computed. In one or more embodiments, this rounding gives the rank HarmRank of the clock harmonic which is the closest from the central frequency of the received signal Frx. As an example, in the case of the signal 202 at 940.8 MHz of FIG. 2, with a reference clock signal at 19.2 MHz, the nearest harmonic would be of rank 49 (940.8/19.2). In one or more embodiments, it allows the determination of the nearest harmonic (=HarmRank*Fref) of the clock signal from the central frequency Frx of the received frequency band.

In a step 506 (SpurOffset=Frx−HarmRank*Fref), the difference Frx-HarmRank*Fref is performed and the result SpurOffset is stored.

In a step 508 (|SpurOffset|<half bandwidth?), the absolute value of SpurOffset is compared to the half bandwidth value of the received signal. In the example of FIG. 2, the half bandwidth value is 200 kHz/2=100 kHz. In one or more embodiments, if the absolute value of SpurOffset is inferior to the half bandwidth of the received signal (branch Y), i.e. if the nearest clock harmonic spur falls in the received signal channel, then step 510 (IF=SpurOffset) is performed, fixing the intermediate frequency at the SpurOffset value. In one or more embodiments, if the absolute value of SpurOffset is superior to the half bandwidth (branch N), i.e. if the nearest clock harmonic spur is out of the received signal channel, then a step 512 (IF=std NZIF value) is performed. In other words, in one or more embodiments, the intermediate frequency IF is set at a value which is not dependent on a harmonic spur frequency, for example a value used in NZIF usual methods such as ±480 kHz.

In one or more embodiments, in the case where the RX frequency is an integer multiple of the reference clock signal Fref, then step 510 is implemented with SpurOffset=IF=0 Hz, which is equivalent to a direct conversion.

In a step 514 (LO=Frx+IF), the result of the steps 510 or 512 (depending on the result of step 508) is implemented to compute the local oscillator frequency LO=Frx+IF.

In one or more embodiments, the algorithm is then exited in a step 516 (Exit RxIF Selection). In an example, the method of FIG. 4 can then be performed using the calculated LO=Frx+IF value.

In one or more embodiments, the algorithm of FIG. 5 is, for example, performed each time the received signal has its central frequency changed or in the case where the clock signal reference frequency changes.

Figure 6:
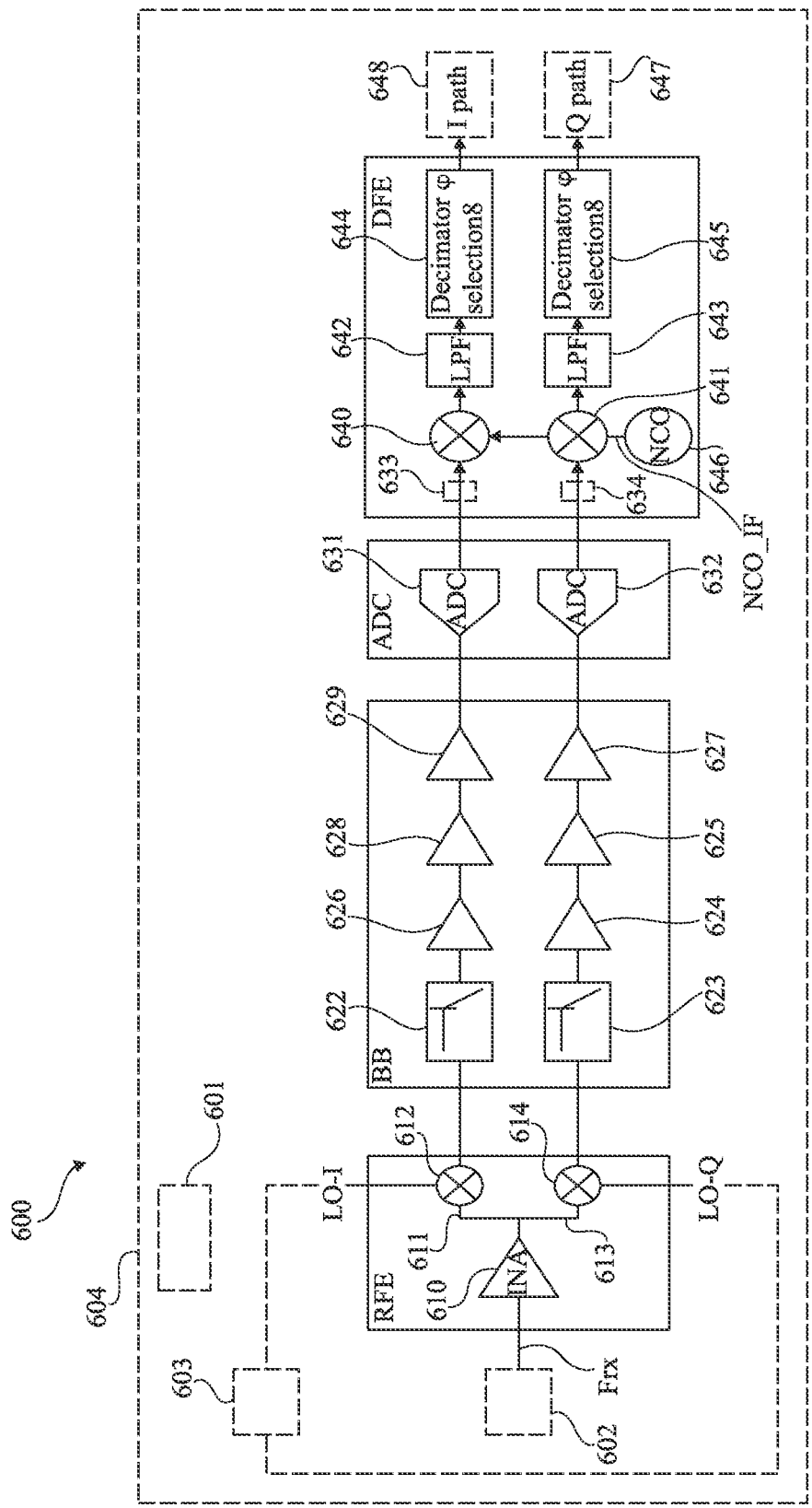
FIG. 6 illustrates an embodiment of a RF circuit.

FIG. 6 illustrates an embodiment of a RF circuit 500. More precisely, in one or more embodiments, the RF circuit 500 can be used to implement the methods of FIGS. 4 and 5.

In one or more embodiments, the RF circuit 600 comprises, for example, a clock circuit 601, configured to generate the clock signal with the reference frequency Fref, and a Near Zero Intermediate Frequency (NZIF) receiver 604. Alternatively, in one or more embodiments, the clock circuit 601 is arranged out of the RF circuit, or in the NZIF receiver.

In the represented example, the NZIF receiver comprises a first module RFE (RF Front-End) coupled, or preferably connected, to a second module BB (Base Band). In one or more embodiments, the second module BB is coupled, or preferably connected, to a third module ADC (Analog Digital Converter), which is coupled, or preferably connected, to a fourth module DFE (Digital Front End).

In one or more embodiments, the first module RFE comprises an amplifier 610, for example a low noise amplifier LNA (Low Noise Amplifier), configured to amplify the received RF signal Frx. In one or more embodiments, the amplified signal is then split into two different paths 611, 613. In one or more embodiments, the first module comprises one mixer 612, 614 per path. In one or more embodiments, each of the mixers 612, 614 is configured to mix the received RF signal Frx of the corresponding path with a signal having the local oscillator frequency LO. In the disclosed embodiments, the frequency LO corresponds to the sum of the central frequency Frx of the received signal and of the intermediate frequency IF determined, for example, on the basis of the algorithm of FIG. 5. In one or more embodiments, the local oscillator frequency LO of path 611 corresponds to an in-phase signal LO-I and the local oscillator frequency LO of path 613 corresponds to a quadrature signal LO-Q. In one or more embodiments, the in-phase LO-I and quadrature LO-Q signals are respectively real and imaginary parts of a signal with the frequency LO and supplied by a local oscillator 603. In one or more embodiments, the derotation of step A' of FIG. 4 is implemented by the mixers 612 and 614 respectively. In one or more embodiments, the mixed signals at the output of the mixers 612 and 614 have the intermediate frequency IF, respectively in phase and in quadrature.

In one or more embodiments, the mixed signals at the output of the mixers 612, 614 are respectively coupled, or preferably connected, to a different frequency filter 622, 623 of the second module BB which is configured to filter out frequencies superior to, for example, two or three times the NZIF frequency. In one or more embodiments, this filtering performs an attenuation of band signals which relax the requirements of further components of the receiver.

In one or more embodiments, the outputs of the filters 622, 623 are respectively, coupled, or preferably connected, to a different series of amplifiers (626, 628, 629 for the first path 611 and 624, 625, 627 for the second path 613), which are for example programmable gain amplifiers of the second module BB. iomq The number of amplifiers may depend on the application.

In one or more embodiments, the output of the amplifiers 629 and 627 are respectively coupled, or preferably connected, to different analog to digital converters (ADC) 631, 632 of the third module to convert the filtered and amplified signals of the second module into digital signals.

In one or more embodiments, the fourth module DFE comprises optional DC offset removal circuits 633, 634 coupling the output of the analog to digital converters 631 to a mixer 640 for the first path 611 and the analog to digital converter 632 to another mixer 641 for the second path 613. In one or more embodiments, DC offset removal circuits 633, 634 are configured to remove unwanted DC bias which may originate from the received signal Frx or from the ADC circuits to improve system performance degradation and bit error rate.

In the represented example, an oscillator 646 (NCO) of the fourth module DFE, which is for example a numerically controlled oscillator, supplies a signal NCO_IF having the intermediate frequency IF to the mixers 640 and 641.

The derotation of step B' of FIG. 4 is implemented by mixers 640, 641 for the signals of first and second paths respectively.

In one or more embodiments, a low pass filter 642 (LPF) of the first path couples the output of the mixer 640 to a first decimator 644 (Decimator φ selection8) and another low pass filter 643 (LPF) of the second path couples the output of the mixer 641 to a second decimator 645 (Decimator φ selection8). In one or more embodiments, the decimator is configured to reduce the data rate by removing samples from the data stream without impacting the signal. In the represented example, the decimators are configured to decimate-by-eight. Other configurations are possible, for example, decimate-by-two. In one or more embodiments, decimate-by-two function is equivalent to a data converter clocked at half the original rate, with an analog anti-aliasing filter at half the original Nyquist bandwidth. In one or more embodiments, the decimation filter by eliminates unwanted signal images. It also eliminates half of the noise power. In one or more embodiments, because the desired signal remains unchanged and the noise power reduces by half, there is an overall signal-to-noise ratio (SNR) improvement. In one or more embodiments, for any arbitrary decimation factor D, SNR improves by 10*log(D).

In one or more embodiments, the outputs of the decimators 644 and 645 are respectively coupled, or preferably connected, to a digital signal processor (DSP) inputs 648 (I path) and 647 (Q path) to analyze the demodulated received signal.

Figure 7A:
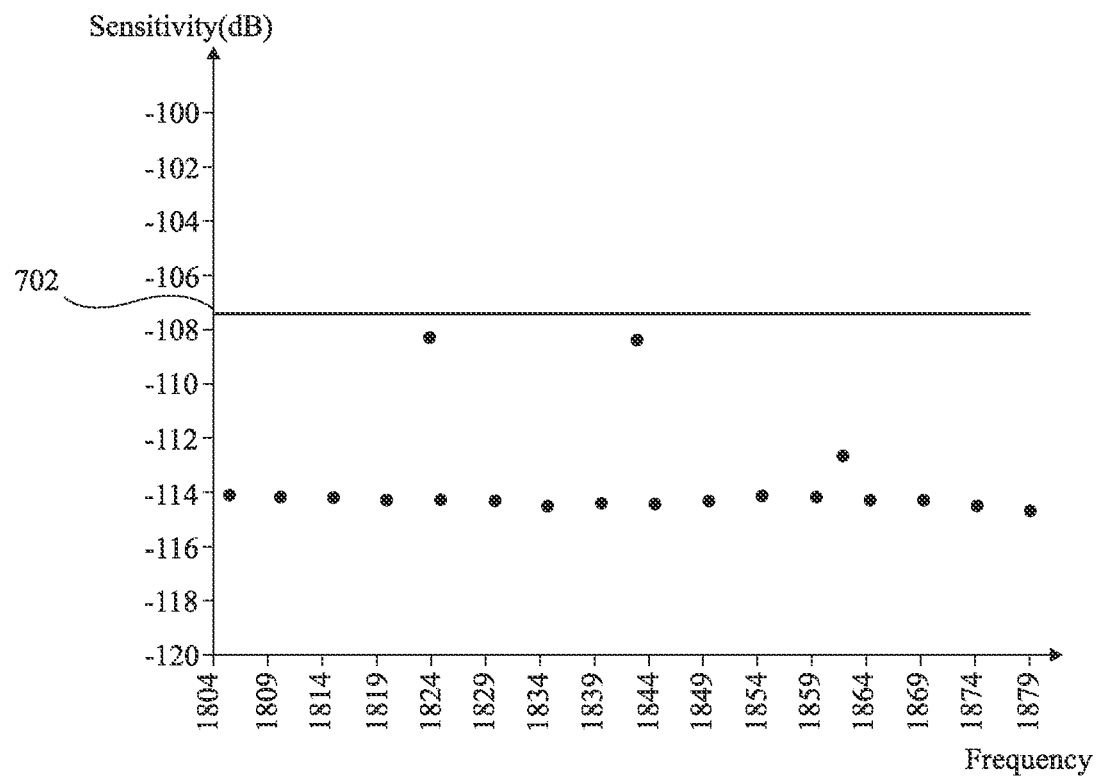
FIG. 7A illustrates a frequential sensitivity measurement resulting from the method of FIG. 3.

FIG. 7A illustrates a frequential sensitivity measurement resulting from the method of FIG. 3.

Figure 7B:
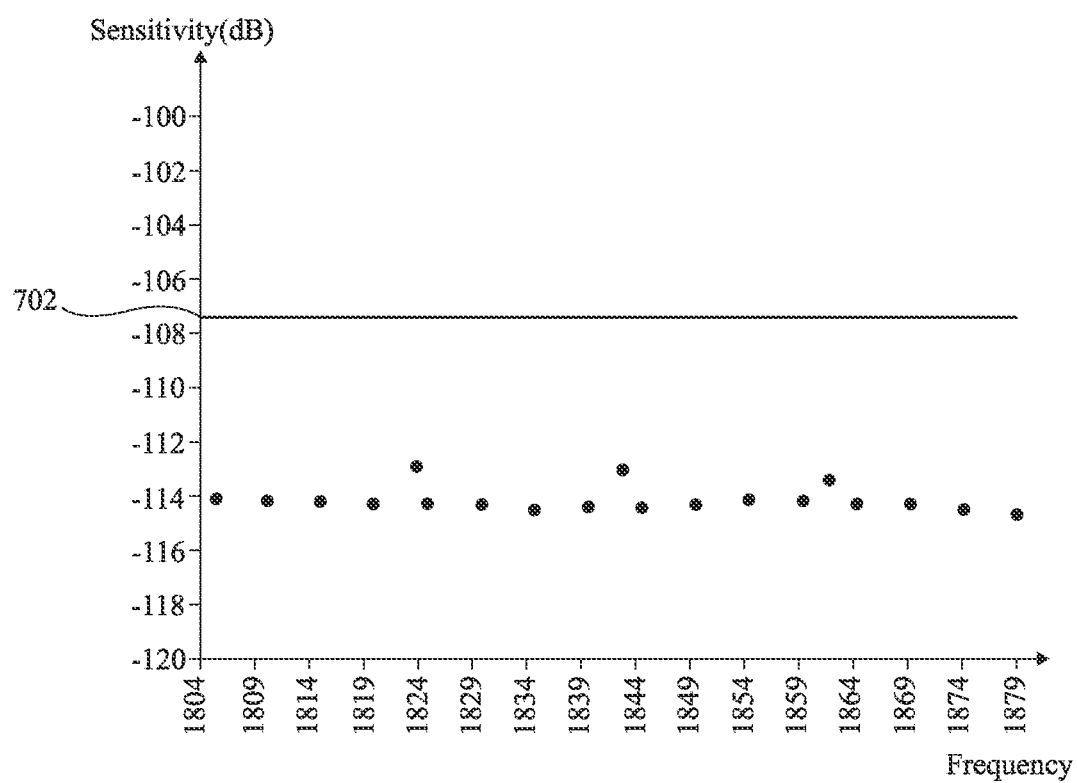
FIG. 7B illustrates a frequential sensitivity measurement resulting from the method of FIGS. 4 and 5.

FIG. 7B illustrates a frequential sensitivity measurement resulting from the method of FIGS. 4 and 5.

In the example of FIG. 7A, the minimum signal sensitivity 702 required by the NBIOT standards is around −107.5 dB. In one or more embodiments, at frequencies around 1824 MHz (95*19.2 MHz), 1843 MHz (96*19.2 MHz) and 1862 MHz (97*19.2 MHz), clock harmonic spurs create a loss of sensitivity which can be close to the acceptable limit.

In the example of FIG. 7B, once the algorithm of FIG. 5 is implemented, at the frequencies around 1824 MHz, 1843 MHz and 1862 MHz, loss of sensitivity due to the clock harmonic spurs is drastically reduced.

Various embodiments and variants have been described. Those skilled in the art will understand that certain features of these embodiments can be combined and other variants will readily occur to those skilled in the art. In particular, the example of FIG. 4 only considers a single reference clock signal. In one or more embodiments, if multiple clocks with non-integer ratio risk to cause deaf channels, the algorithm can be applied to all clocks in sequence.

Finally, in one or more embodiments, the practical implementation of the embodiments and variants described herein is within the capabilities of those skilled in the art based on the functional description provided hereinabove. In particular, in one or more embodiments, the proposed methods and circuits may be used for different RF signal bands such as 4G, 5G, IoT or non-cellular RF standards BT, ZigBee or other industry standards.

What is claimed is:

1. A method for demodulating a radio frequency (RF) signal, the method comprising:
   determining a nearest harmonic of a clock signal from a central frequency of a received frequency band; and
   when the nearest harmonic is in the received frequency band, setting an intermediate frequency of a Near Zero Intermediate Frequency (NZIF) receiver to a difference between the central frequency and the nearest harmonic.

2. The method of claim 1, wherein, when the nearest harmonic is out of the received frequency band, the intermediate frequency is set to a nominal NZIF value.

3. The method of claim 1, wherein the determining of the nearest harmonic comprises determining a rounding of a ratio between the central frequency of the received frequency band and a frequency value of the clock signal.

4. The method of claim 3, wherein the nearest harmonic is equal to a product of the rounding by the frequency value of the clock signal.

5. The method of claim 4, wherein:
   when an absolute value of the difference between the central frequency and the nearest harmonic is inferior to a half bandwidth value of the RF signal, the nearest harmonic is in the received frequency band, and
   when the absolute value of the difference between the central frequency and the nearest harmonic is not inferior to the half bandwidth value of the RF signal, the nearest harmonic is out of the received frequency band.

6. The method of claim 1, further comprising:
   amplifying the RF signal; and
   splitting the amplified RF signal into a first path and a second path to obtain a first path signal and a second path signal.

7. The method of claim 6, further comprising:
   mixing the first path signal with an in-phase signal of a local oscillator frequency corresponding to a sum of the central frequency and the intermediate frequency to obtain a first mixed signal; and
   mixing the second path signal with a quadrature signal of the local oscillator frequency to obtain a second mixed signal.

8. The method of claim 7, further comprising:
   filtering first high frequencies of the first mixed signal of the first path and the second mixed signal of the second path to obtain a first filtered signal corresponding to the first mixed signal and a second filtered signal corresponding to the second mixed signal; and
   amplifying the first filtered signal and the second filtered signal to obtain a first amplified filtered signal corresponding to the first filtered signal and a second amplified filtered signal corresponding to the second filtered signal.

9. The method of claim 8, further comprising converting the first amplified filtered signal and the second amplified filtered signal into digital signals.

10. The method of claim 9, further comprising mixing the digital signals with a third signal having the intermediate frequency to obtain digital mixed signals.

11. The method of claim 10, further comprising filtering second high frequencies of the digital mixed signals.

12. The method of claim 11, comprising performing a decimation operation of the digital mixed signals.

13. An apparatus for demodulating a radio frequency (RF) signal, comprising:

an RF signal demodulation circuit configured to:

determine a nearest harmonic of a clock signal from a central frequency of a received frequency band; and when the nearest harmonic is in the received frequency band, set an intermediate frequency of a Near Zero Intermediate Frequency (NZIF) receiver to a difference between the central frequency and the nearest harmonic.

14. The apparatus of claim 13, wherein, when the nearest harmonic is out of the received frequency band, the intermediate frequency is set to a nominal NZIF value.

15. The apparatus of claim 13, wherein the determination of the nearest harmonic comprises determining a rounding of a ratio between the central frequency of the received frequency band and a frequency value of the clock signal.

16. The apparatus of claim 15, wherein the nearest harmonic is equal to a product of the rounding by the frequency value of the clock signal.

17. The apparatus of claim 16, wherein:

when an absolute value of the difference between the central frequency and the nearest harmonic is inferior to a half bandwidth value of the RF signal, the nearest harmonic is in the received frequency band, and when the absolute value of the difference between the central frequency and the nearest harmonic is not inferior to the half bandwidth value of the RF signal, the nearest harmonic is out of the received frequency band.

18. An apparatus for demodulating a radio frequency (RF) signal, comprising:

an RF signal demodulation circuit configured to:

determine a nearest harmonic of a clock signal from a central frequency of a received frequency band;

when the nearest harmonic is in the received frequency band, set an intermediate frequency of a Near Zero Intermediate Frequency (NZIF) receiver to a difference between the central frequency and the nearest harmonic;

amplify the RF signal; and split the amplified RF signal into a first path and a second path to obtain a first path signal and a second path signal.

19. The apparatus of claim 18, wherein the RF signal demodulation circuit is further configured to:

mix the first path signal with an in-phase signal of a local oscillator frequency corresponding to a sum of the central frequency and the intermediate frequency to obtain a first mixed signal, and mix the second path signal with a quadrature signal of the local oscillator frequency to obtain a second mixed signal.

20. The apparatus of claim 19, wherein the RF signal demodulation circuit is further configured to:

filter first high frequencies of the first mixed signal of the first path and the second mixed signal of the second path to obtain a first filtered signal corresponding to the first mixed signal and a second filtered signal corresponding to the second mixed signal; and amplify the first filtered signal and the second filtered signal to obtain a first amplified filtered signal corresponding to the first filtered signal and a second amplified filtered signal corresponding to the second filtered signal.

21. The apparatus of claim 20, wherein the RF signal demodulation circuit is further configured to convert the first amplified filtered signal and the second amplified filtered into digital signals.

22. The apparatus of claim 21, wherein the RF signal demodulation circuit is further configured to mix the digital signals with a third signal having the intermediate frequency to obtain digital mixed signals.

23. The apparatus of claim 22, wherein the RF signal demodulation circuit is further configured to filter second high frequencies of the digital mixed signals.

24. The apparatus of claim 23, wherein the RF signal demodulation circuit is further configured to perform a decimation operation of the digital mixed signals.

* * * * *

UNITED STATES PATENT AND TRADEMARK OFFICE
CERTIFICATE OF CORRECTION

PATENT NO. : 12,445,331 B2
APPLICATION NO. : 18/535788
DATED : October 14, 2025
INVENTOR(S) : Didier Harnay Page 1 of 1

It is certified that error appears in the above-identified patent and that said Letters Patent is hereby corrected as shown below:

In the Claims

In Column 10, Line 31, Claim 21:
Change "and the second amplified filtered"
To --and the second amplified filtered signal--

Signed and Sealed this
Twenty-fifth Day of November, 2025

John A. Squires
*Director of the United States Patent and Trademark Office*